(12) United States Patent
Anderson et al.

(10) Patent No.: US 7,296,065 B2
(45) Date of Patent: Nov. 13, 2007

(54) SYSTEM FOR ON-LINE FINANCIAL SERVICES USING DISTRIBUTED OBJECTS

(75) Inventors: William P. Anderson, Kansas City, KS (US); Jacob B. Geller, Montclair, NJ (US)

(73) Assignee: Block Financial Corporation, Kansas City, MO (US)

( * ) Notice: Subject to any disclaimer, the term of this patent is extended or adjusted under 35 U.S.C. 154(b) by 0 days.

(21) Appl. No.: 11/306,170

(22) Filed: Dec. 19, 2005

(65) Prior Publication Data

US 2006/0179117 A1 Aug. 10, 2006

Related U.S. Application Data

(63) Continuation of application No. 09/932,373, filed on Aug. 17, 2001, now Pat. No. 7,032,008, which is a continuation of application No. 09/540,140, filed on Mar. 31, 2000, now abandoned, which is a continuation of application No. 08/902,239, filed on Jul. 29, 1997, now Pat. No. 6,131,115, which is a continuation of application No. 08/580,074, filed on Dec. 20, 1995, now Pat. No. 5,706,442.

(51) Int. Cl.
*G06F 15/16* (2006.01)
(52) U.S. Cl. ...................... 709/217; 709/219
(58) Field of Classification Search ............ 705/35–44, 705/36 R, 67–74, 2, 1; 709/207, 217, 219; 713/200, 201; 707/200, 104.4, 104.1; 719/320, 719/350; 710/1; 235/379, 380
See application file for complete search history.

(56) References Cited

U.S. PATENT DOCUMENTS

| | | | |
|---|---|---|---|
| 4,317,957 A | * | 3/1982 | Sendrow ...................... 705/71 |
| 4,346,442 A | | 8/1982 | Musmanno |
| 4,529,870 A | * | 7/1985 | Chaum ...................... 235/380 |
| 4,727,243 A | | 2/1988 | Savar |
| 4,823,122 A | | 4/1989 | Mann et al. |
| 4,975,904 A | | 12/1990 | Mann et al. |
| 4,975,905 A | | 12/1990 | Mann et al. |
| 5,058,108 A | | 10/1991 | Mann et al. |
| 5,136,716 A | | 8/1992 | Harvey et al. |
| 5,187,787 A | | 2/1993 | Skeen et al. |
| 5,195,130 A | | 3/1993 | Weiss et al. |
| 5,220,501 A | | 6/1993 | Lawlor et al. |
| 5,230,048 A | | 7/1993 | Moy |
| 5,257,369 A | | 10/1993 | Skeen et al. |

(Continued)

OTHER PUBLICATIONS

Sirbu, et al., "NetBill: An Internet Commerce System Optimized for Network-Delivered Services", IEEE Personal Communications, pp. 34-29, vol. 2, Issue 4, Aug. 1995.

(Continued)

*Primary Examiner*—Prabodh Dharia
(74) *Attorney, Agent, or Firm*—Standley Law Group LLP (57) ABSTRACT

A system is disclosed for accessing recent financial information from various financial services providers. The system is based on a client/server architecture so that services are accessible from a variety of presentation tools. Communications between clients and servers are accomplished using "Interfaces" that group operations and attributes for various services. The system uses the TCP/IP protocol suite so financial services are available at any time and from any location.

53 Claims, 3 Drawing Sheets

U.S. PATENT DOCUMENTS

| | | | |
|---|---|---|---|
| 5,283,829 A | | 2/1994 | Anderson |
| 5,336,870 A | | 8/1994 | Hughes et al. |
| 5,339,392 A | | 8/1994 | Risberg et al. |
| 5,351,186 A | | 9/1994 | Bullock et al. |
| 5,383,113 A | | 1/1995 | Kight et al. |
| 5,404,523 A | | 4/1995 | DellaFera et al. |
| 5,425,028 A | | 6/1995 | Britton et al. |
| 5,434,974 A | | 7/1995 | Loucks et al. |
| 5,437,029 A | | 7/1995 | Sinha |
| 5,455,903 A | | 10/1995 | Jolissaint et al. |
| 5,457,797 A | | 10/1995 | Butterworth et al. |
| 5,485,370 A | | 1/1996 | Moss et al. |
| 5,528,490 A | | 6/1996 | Hill |
| 5,535,407 A | | 7/1996 | Yanagawa et al. |
| 5,570,465 A | | 10/1996 | Tsakanikas |
| 5,590,133 A | | 12/1996 | Billstrom et al. |
| 5,590,197 A | | 12/1996 | Chen et al. |
| 5,611,052 A | | 3/1997 | Dykstra et al. |
| 5,644,727 A | * | 7/1997 | Atkins .................. 705/40 |
| 5,644,778 A | * | 7/1997 | Burks et al. ............ 705/2 |
| 5,659,731 A | | 8/1997 | Gustafson |
| 5,668,952 A | | 9/1997 | Slane |
| 5,671,279 A | | 9/1997 | Elgamal |
| 5,678,046 A | | 10/1997 | Cahill et al. |
| 5,696,965 A | | 12/1997 | Dedrick |
| 5,699,527 A | * | 12/1997 | Davidson .............. 705/38 |
| 5,701,451 A | | 12/1997 | Rogers et al. |
| 5,706,434 A | | 1/1998 | Kremen et al. |
| 5,706,442 A | * | 1/1998 | Anderson et al. ...... 705/27 |
| 5,708,825 A | | 1/1998 | Sotomayor |
| 5,727,158 A | | 3/1998 | Bouziane et al. |
| 5,729,689 A | | 3/1998 | Allard et al. |
| 5,745,654 A | | 4/1998 | Titan |
| 5,749,075 A | | 5/1998 | Toader et al. |
| 5,754,850 A | | 5/1998 | Janssen |
| 5,758,351 A | | 5/1998 | Gibson et al. |
| 5,797,133 A | | 8/1998 | Jones et al. |
| 5,812,776 A | | 9/1998 | Gifford |
| 5,832,100 A | * | 11/1998 | Lawton et al. ........ 382/100 |
| 5,842,185 A | | 11/1998 | Chancey et al. |
| 5,852,811 A | | 12/1998 | Atkins |
| 5,870,721 A | | 2/1999 | Norris |
| 5,878,215 A | | 3/1999 | Kling et al. |
| 5,878,403 A | | 3/1999 | DeFrancesco et al. |
| 5,892,900 A | * | 4/1999 | Ginter et al. .......... 726/26 |
| 5,911,136 A | | 6/1999 | Atkins |
| 5,913,202 A | * | 6/1999 | Motoyama ............ 705/36 R |
| 5,924,082 A | | 7/1999 | Silverman et al. |
| 5,940,811 A | | 8/1999 | Norris |
| 5,966,699 A | | 10/1999 | Zandi |
| 5,978,780 A | * | 11/1999 | Watson .................. 705/40 |
| 5,987,454 A | | 11/1999 | Hobbs |
| 5,995,947 A | | 11/1999 | Fraser et al. |
| 6,009,415 A | | 12/1999 | Shurling et al. |
| 6,014,645 A | | 1/2000 | Cunningham |
| 6,023,684 A | * | 2/2000 | Pearson ................ 705/36 R |
| 6,026,430 A | | 2/2000 | Butman et al. |
| 6,094,643 A | * | 7/2000 | Anderson et al. ...... 705/44 |
| 6,108,641 A | | 8/2000 | Kenna et al. |
| 6,131,115 A | | 10/2000 | Anderson et al. |
| 6,199,077 B1 | | 3/2001 | Inala et al. |
| 6,278,993 B1 | | 8/2001 | Kumar et al. |
| 6,317,783 B1 | | 11/2001 | Freishtat et al. |
| 6,424,951 B1 | | 7/2002 | Shurling et al. |
| 6,442,532 B1 | * | 8/2002 | Kawan .................. 705/36 R |
| 7,032,008 B2 | | 4/2006 | Anderson et al. |
| 2003/0233328 A1 | | 12/2003 | Scott et al. |
| 2005/0044280 A1 | | 2/2005 | Reisman |
| 2005/0049924 A1 | | 3/2005 | DeBettencourt et al. |

OTHER PUBLICATIONS

Slone, et al., "Handbook of Local Area Networks", Auerbach Publications, 1991 (ISBN 0-7913-0868-5).

"American Express Services Go On-Line," Mergers & Acquisitions, p. 8, v.29, n.5, Mar. 1995.

"Bank Offer Customers Internet Access," Multimedia Daily, Mar. 22, 1995. ISSN: 1079-4212.

Everest, Gordon C., Database Management, McGraw-Hill Series in Management Information Systems, 1986. ISBN: 0-07-019781-4.

"ExpressNet Bows (American Express Launches Online Service Called ExpressNet)," Information Week, p. 17, n.514, Feb. 13, 1995.

Miailovich, Jill, "QuickXpense Introduces Automatic Pre-Population of Expense Reports," Business Wire, p. 1, s. 1, May 8, 1995.

"Online Service Allows Account Review (Block Financial Corp.)," Card News, p. 3, v.9, n.21, Oct. 31, 1994.

"On-Line Services Give Acount Holders Transaction Info," Newbytes News Network, Feb. 2, 1995.

"User's Guide for Quicken," (Version 2 for Windows), Intuit, p. 206, 1992.

Zutell, Irene. "AMEX Says On-Line Booking Keeps Travel Agents in the Loop," Travel Agent, Feb. 6, 1995. ISSN: 1053-9360.

The Cushing Group, Inc., "Introduction to Distributed Client/Server Computing with ObjectBroker," ObjectWorld San Francisco, Jul. 1994 (PowerPoint slides).

The Cushing Group, Inc., "Using CORBA to Integrate Legacy Systems," ObjectWorld Boston, Mar. 22, 1995 (PowerPoint slides).

The Cushing Group, Inc., "Lessons Learned Deploying a Large-Scale Distributed Object Computing Environment," ObjectWorld Boston, May 1996 (PowerPoint slides).

Ronayne, Michael L. and Townsend, Erik S., "Preserving the past, designing the future," Object Magazine, Sep. 1995.

"Wells Fargo: Innovations in Customer Management," American Banker, Nov. 3, 1997.

Berkov, Barry, "CompuServ," Keynote address given at Internet Telecom 95, Geneva Arena, Geneva, Switzerland, Oct.8, 1995.

Birrel, A.D. and Nelson, B., "Implementing Remote Procedures Calls," ACM Transactions on Computer Systems, pp. 39-59, vol. 2, No. 1 (1984).

Business Example: A Case Study, Slide Show, US: The Cushing Group, Inc., 1994-1997.

CORBAservices specification—v1.0, Mar. 1995. Available as pdf from http://cgi.omg.org/cgi-bin/doc?formal/97-02-08.pdf. Last access Jan. 30, 2003.

Denitto, Kathryn E., "DCE Means Business," DCE Technology Manager, Mar. 20, 1995, http://www.opengroup.org/dce/, last accessed Feb. 26, 2003.

Distributed Application Software: Architecture and Design. Slide Show. US: The Cushing Group, Inc., 1992-1993.

Edwards, Jeri and Devoe, Deborah, "Wells Fargo Leads the Way to Internet Banking," Three-Tier Client/Server at Work 1997:107-130 (Ch. 6).

Edwards, Nigel and Rees, Owen, "Distributed Objects and the World Wide Web." (ANSA) Cambridge, UK, Architecture Projects Mgmt., Ltd., Aug. 24, 1994.

Kendall, Samuel C., Waldo, Jim, Wollrath, Ann and Wyant, Geoff, "A Note on Distributed Computing," TR-94-29, Sun Microsystems, http://research.sun.com/techrep/1994/abstract-29.html, last access Feb. 24, 2003.

Orbix Advance Programmer's Guide, Release 1.3.1. Dublin Ireland: IONA Technologies, Ltd., Feb. 1995.

The Orbix Architecture. Dublin, Ireland: IONA Technologies, Ltd., Aug. 1993.

Orbix Programmer's Guide, Release 1.3. Dublin, Ireland: IONA Technologies, Ltd., Apr. 1995.

"Remote Procedure Call in a Distributed Computing Environment," The Open Software Foundation, 1990, http://www.mit.bme.hu/~kiss/docs/dce/rpc.html, last accessed Feb. 26, 2003.

Ronayne, Michael L. and Townsend, Erik S., "A Case Study: Distributed Object Technology at Wells Fargo Bank" (Cushing Group white paper) US: The Cushing Group, Inc., 1996.

Sirbu, Marvin and Tygar, J.D., "NetBill: An Internet Commerce System Optimized for Network-Delivered Services," IEEE Perrsonal Communications, Aug. 1995:34-39.

Smith, Mark, "Interview with Bruce MacNaughton," Windows & Net Magazine Nov. 1996, Mar. 6, 2003 <http://www.winnetmag.com/Articles/Index.cfm?ArticleID=2823>.

Gomer, Thomas, ANSA Phase III: Trader Implementation with Orbix & ALLBASE (TC Talk, Jun. 1994), Cambridge, UK: Architecture Projects Mgmt. Ltd., Sep. 2, 1994.

Truncale, David, "CompuServe Brings NT Online." Windows & Net Magazine Nov. 1996, Mar. 6, 2003 <http://www.winnetmag.com/Articles/Index.cfm?ArticleID=2822>.

"Wells Fargo Bank is First to Offer Customers Internet Access to Bank Account Balances," San Francisco, CA: Wells Fargo Bank, May 18, 1995.

Seybold, Patricia, "Chapter 6—Provide a 360-Degree View," Customers.com: How to Create a Profitable Business Strategy for the Internet and Beyond, pp. 1993-213, Toronto: Random House, 1998.

Ronayne, Michael L., "The Business Case for Distributed Computing," Object World, San Francisco, CA: The Cushing Group, Inc., Aug. 1995.

Reardon, et al., Novell's Dictionary of Networking, Copyright 1994.

* cited by examiner

SYSTEM FOR ON-LINE FINANCIAL SERVICES USING DISTRIBUTED OBJECTS

CROSS REFERENCES TO RELATED APPLICATIONS

This application is a continuation of U.S. patent application Ser. No. 09/932,373, filed Aug. 17, 2001, entitled SYSTEM FOR ON-LINE FINANCIAL SERVICES USING DISTRIBUTED OBJECTS, now U.S. Pat. No. 7,032,008, issued Apr. 18, 2006, which is a continuation of U.S. patent application Ser. No. 09/540,140 filed Mar. 31, 2000, entitled SYSTEM FOR ON-LINE FINANCIAL SERVICES USING DISTRIBUTED OBJECTS, now abandoned, which is a continuation of U.S. patent application Ser. No. 08/902,239, filed Jul. 29, 1997, entitled SYSTEM FOR ON-LINE SERVICES USING DISTRIBUTED OBJECTS, which is now U.S. Pat. No. 6,131,115, issued Oct. 10, 2000, which is a continuation of U.S. patent application Ser. No. 08/580,074, filed Dec. 20, 1995, entitled SYSTEM FOR ON-LINE FINANCIAL SERVICES USING DISTRIBUTED OBJECTS, which is now U.S. Pat. No. 5,706,442, issued Jan. 6, 1998.

BACKGROUND AND SUMMARY OF THE INVENTION

The present invention relates generally to client/server computer systems. Particularly, the present invention relates to a client/server architecture for delivering financial services to customers of various financial institutions.

Customers of various types of financial institutions such as banks, stock brokerages, credit card companies, and insurance companies often have a need to access information regarding recent account activity or their account balances. Typically, financial information is reported to customers in the form of monthly statements that list the account's activity and balance for the previous month. By the time these statements are processed and sent, they no longer reflect the current state of the account. Account balances may change on a daily basis for a variety of reasons including the addition of interest earned or the processing of a new transaction.

Customers in need of more timely information regarding their accounts usually have the option of calling a customer service representative of the financial institution to request a balance or activity report. Although the information is timely, it may be difficult or inconvenient to obtain. First, customers must call each institution from which they would like to obtain current information. When calling, they may need to wait for someone who can help. At other times, they may be required to traverse many levels of an automated attendant before reaching an option that will allow them to accomplish a specific task such as obtaining a current account balance. In either case, the information is presented verbally rather than in a written form that more closely resembles a statement. Finally, whether the information is communicated verbally or through a written statement, customers who wish to use the information in a computer program must enter it manually. In addition to the inconvenience, the process of manually entering the data is also error prone.

Customers of various financial institutions therefore, have a need to access recent financial information at their own convenience—preferably, from anywhere and at any time. Furthermore, customers have a need to see the financial data presented in an organized and understandable format similar to the monthly statement format with which customers are familiar. The present invention—ConductorsSystem Architecture (Conductor)—supports a suite of on-line financial services from various financial services providers. Supported services include credit card account lookup and reporting, and checking and bill paying. In addition, customers and financial services providers may communicate with each other. Finally, the financial information obtained electronically may be downloaded directly to customers' personal computers for further processing. The need for manual data entry is eliminated.

The present invention is a sophisticated computer software system based on distributed system technology. Within the system, use of the TCP/IP protocol suite for communications with major components of the system allows the financial services to be accessed through the Internet. The same services may also be accessed directly through an on-line information service such as CompuServe®. Conductor supports a distributed "information cluster" located on the global Internet so it may be accessed at any time from around the world using any one of a number of presentation tools. A variety of financial services from a number of independent financial services providers are supported by the system so that users may review activity and balances relating to different types of accounts. The ability to use a variety of presentation tools to access a suite of financial services supported by a variety of financial services providers is unique to the present invention. The advantages of the present invention and others are explained further by the accompanying drawings and detailed description.

DETAIL DESCRIPTION OF PREFERRED EMBODIMENT(S)

The Conductor System Architecture (Conductor) and its related protocols provide a robust suite of on-line Interfaces for use by applications, financial service providers, Web (hyper-text transfer protocol—HTTP) servers, and other clients to obtain and manipulate financial information for users of the system. Applying principles of modularity and abstraction, distributed systems technologies are used to define the major components of Conductor and their inter-relationships to allow delivery of diverse types of financial services over a wide area network. Sources of data may be as varied as the Interfaces to it. Financial information systems using the approach of Conductor are easily extensible because Conductor is based on a platform-portable, language-independent distributed object framework. Client components and server components work in concert to provide timely financial information to users of an on-line financial information system built using Conductor. Use of the distributed approach of a client/server model permits the easy integration of new services and providers for the system. For example, server components of Conductor may easily serve as back-end resources for existing on-line service providers. The distributed approach also allows applications running in the system to be accessible through a number of presentation tools or users interfaces (collectively, clients): for example, native Microsoft® Windows® applications, Web (hyper-text mark-up language—HTML) browsers, text-terminals, X.25 transactions, even voice telephony.

Figure 1:
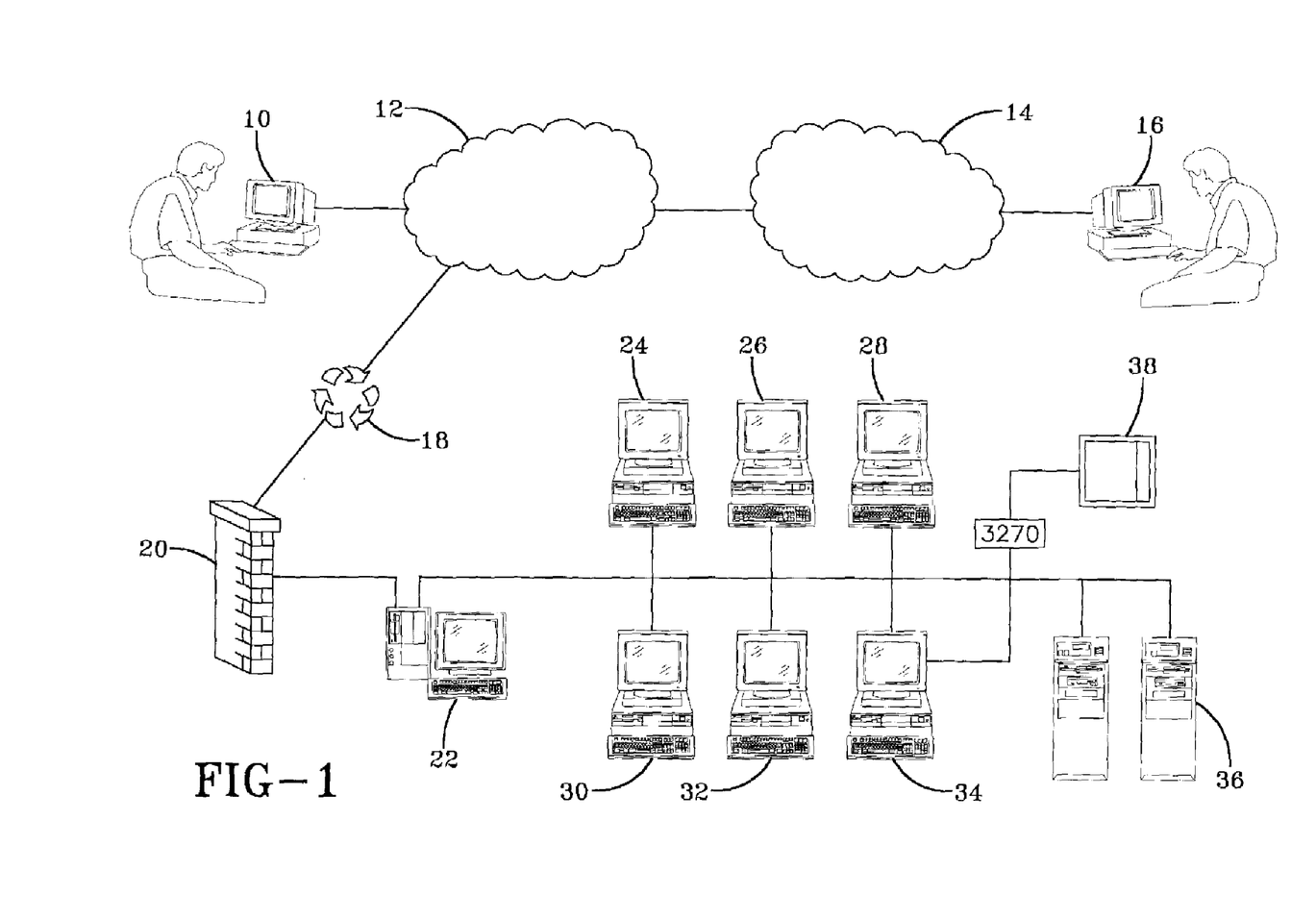
FIG. 1 is a diagram of the Conductor Network illustrating the components of a financial information service system based on the Conductor System Architecture.

Referring to FIG. 1, a diagrammatic representation of the Conductor Network is shown. The Conductor Network illustrates use of the Conductor System Architecture to provide a suite of financial services accessible through different user interfaces. Preferably, users connect to the suite of on-line financial services in the Conductor Network via the Internet 12. Methods for providing services via the Internet are well-known in the art and are not explained here. Host computers in the network are accessible world-wide from any site with TCP/IP name resolution and packet routing to the conductor.com domain. Preferably, host computers running the Windows NT™ Operating System and the UNIX® Operating System are used in the distributed environment. Clients and servers may run on any of twenty operating systems. Multiple user interfaces to applications that are part of the Conductor Network are implemented as different types of clients. As shown in FIG. 1, a user may communicate with a financial application via a Web (hyper-text markup language—HTML) browser 10 or via the CompuServe Information Service 14 using the CompuServe Information Manager for Windows® (WinCIM®) 16. Other methods of access may be used as well—for example, a native Microsoft® Windows® application. In addition, Conductor components may include financial services that are part of an on-line information service so that they are available only to subscribers of the on-line information service.

As shown in FIG. 1, packets destined for the Conductor Network are routed 18 to a Web Server 22 for processing. Because security is a significant issue for on-line financial information systems, a Firewall 20 is established between the Router 18 and the Web Server 22. User verification and data access may then occur in a secure environment. Separate user connect/data access protocols isolate internal/external networks. An indirect method of user identification is used to secure account numbers and sensitive data are passed via two-key encryption. Token passing is used for connected host identification.

The Conductor System Architecture is itself built on a Common Object Request Broker Architecture (CORBA)—compliant Distributed Object Computing Platform. This development platform is well-known in the art and is not explained here. Primary system components include Financial Object Servers, Distributed Name (or Name Lookup) Servers, and Database Servers. Other components include Communication, Security, and Logging servers. As shown in FIG. 1, a number of Distributed Name (or Name Lookup) Servers 24, 26, 28 and Financial Object Servers 30, 32, 34 may be in operation at one time. When running, these servers may communicate with a Legacy System 38 or other Database Servers 36 in order to respond to specific requests for information. Data requests may be serviced in any one of a number of ways. For example, data may be accessed using a Microsoft® SQL Server running on Windows NT™.

Clients and servers in a Conductor based system communicate according to an application-level protocol. The application-level protocol specifies how a client interprets data sent to it by a server. Differences in the implementation of various services are hidden behind this consistent API. Within applications, the protocol for communication between various components is a call-level API. When one part of the application needs something, it calls a procedural interface in another part. Such calls do not return until the procedure has executed so the flow of control is simple and direct. Extending these synchronous procedure calls across the network interface has the advantage of simplifying the access to distributed resources by elevating it to the level of standard procedural mechanisms familiar to a majority of developers.

Clients in a Conductor system have an object-oriented Application Programming Interface (API) to the distributed resources or services using a class-like construct called an "Interface" which groups operations and attributes. Interfaces are used by applications, financial service providers, Web (hyper-text transfer protocol—HTTP) servers, and clients to obtain and manipulate financial information for users of the system. Because clients know only the nature of the Interface, it may be implemented in any manner. For example, Interfaces may be implemented in one language and clients in another. The implementation of an Interface may then be altered at will without affecting any clients. As long as the protocol to the Interface is stable, the client implementation is stable.

Clients located anywhere on the global Internet ask for and bind to services by name. Clients locate Interfaces by naming a server which implements one, and they may do so from any site with a TCP connection to the Conductor domain (conductor.com). The names of servers are provided by a name lookup Interface which runs on the only host whose name clients need to know. Following name lookup, a client begins communication with a server capable of servicing the client's specific request. The access is synchronous and call-level using either C++, Smalltalk, or C. In other words, clients access services by making standard synchronous procedure calls. Client load is automatically apportioned among all ready object servers at lookup time.

There are several benefits to using name lookup to connect clients and servers. A name lookup layer isolates clients from the location or readiness of any individual server. Although the financial information system is based on the Internet Protocol (IP), clients are completely isolated from back-end data sourcing concerns and do not need to know the IP addresses of servers. Using this approach, servers may be added simply by connecting to the network, installing system and server software, and adding the machine name to the lookup database. Consequently, clients are not affected by database, network, operating system, hardware platform, or server architectural changes. For example, native 32-bit Windows® applications may use client-side abstraction libraries that hide details of binding to and executing calls on remote servers. Servers may be implemented on cheap, fast Intel-based Windows NT™ network servers and new servers may be added to the system by copying files over and adding the host name to a single locator file. The distributed nature of the system means that it is composed of relatively simple applications that implement a single Interface or a small group of Interfaces through which clients and servers communicate.

Another benefit of using name lookup to connect clients and servers is that servers may have geographical independence. Site independence for servers means that different servers may be developed and maintained by different financial services providers. User access mechanisms provided by clients remain the same so users may access new financial services using familiar methods.

The interface between clients and servers is binary. For various reasons, a binary interface to information and services is preferable to a textual one. Such an interface is more efficient and the data may be useful in more varied applications. Binary data may be converted to text for viewing by humans, sent in binary form to other providers, or retrieved in binary form and processed by a consumer application. Binary objects may be dragged off of a window and dropped into a finance application or they may be used to generate reports.

Figure 2:
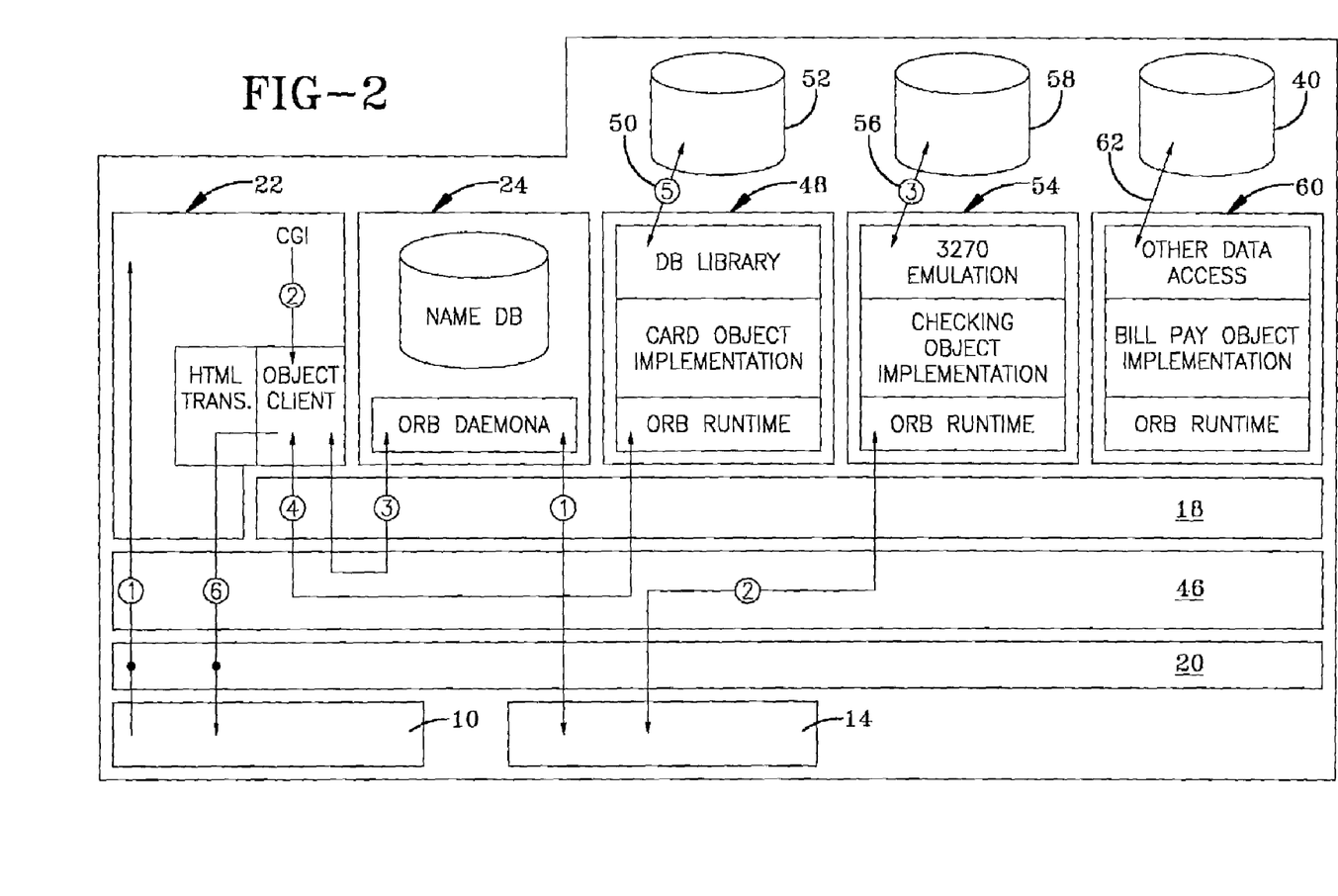
FIG. 2 is a block diagram of the Conductor System Architecture.

Referring to FIG. 2, a diagram of the client and server components of a financial information system based on the Conductor System Architecture is shown. Among the server components supported by Conductor are databases. For example, financial information of interest to users of the system is contained in different databases 52, 58, 40 within the distributed environment. Each database has its own access mechanism 50, 56, 62. As explained earlier, among the methods for accessing a system based on the architecture are a Web (hyper-text markup language—HTML) browser 10 that communicates through a Web Server 22 or a native Windows® application 14.

Regardless of the user interface or client in operation (e.g., Web browser 10 or Windows application 14), a financial information request that includes the name of a financial information service 42, 44 may be transmitted from the client 10, 14 to be processed by the name server 24. In the case of the Windows application 14, the financial information request 42 may be transmitted directly to the name server 24. In the case of the Web browser 10, the financial information request may be processed through a Web server 22 that communicates with the name server 24 to determine the location of the financial server to process the request. This approach therefore allows financial services to be implemented as objects and distributed throughout a wide area network such that they may be found through the name server 24.

The Firewall 20 increases system security of applications running in the Conductor environment. The TCP/IP protocol stack 46 is the Internet communication vehicle. Another Conductor component—the Object Request Broker (ORB)—is an "information bus" that connects clients to the servers or objects they need in a heterogeneous environment. By definition, an ORB is platform independent, language neutral, and may run in many networked environments. In other words, ORBs provide interoperability between applications on different machines in a heterogeneous environment. ORBs implemented in one language may communicate with those implemented in another, on a completely different hardware platform. The same is true for the object implementations to which the ORB provides access. Three example objects are shown in FIG. 2—a card object 48, a checking object 54, and a bill pay object 60. The objects serve as links between clients 10, 14 and data contained in the databases 52, 58, 40. The name server 24 performs the name lookup function for clients so they may establish communication with the financial object that performs the needed services.

Figure 3:
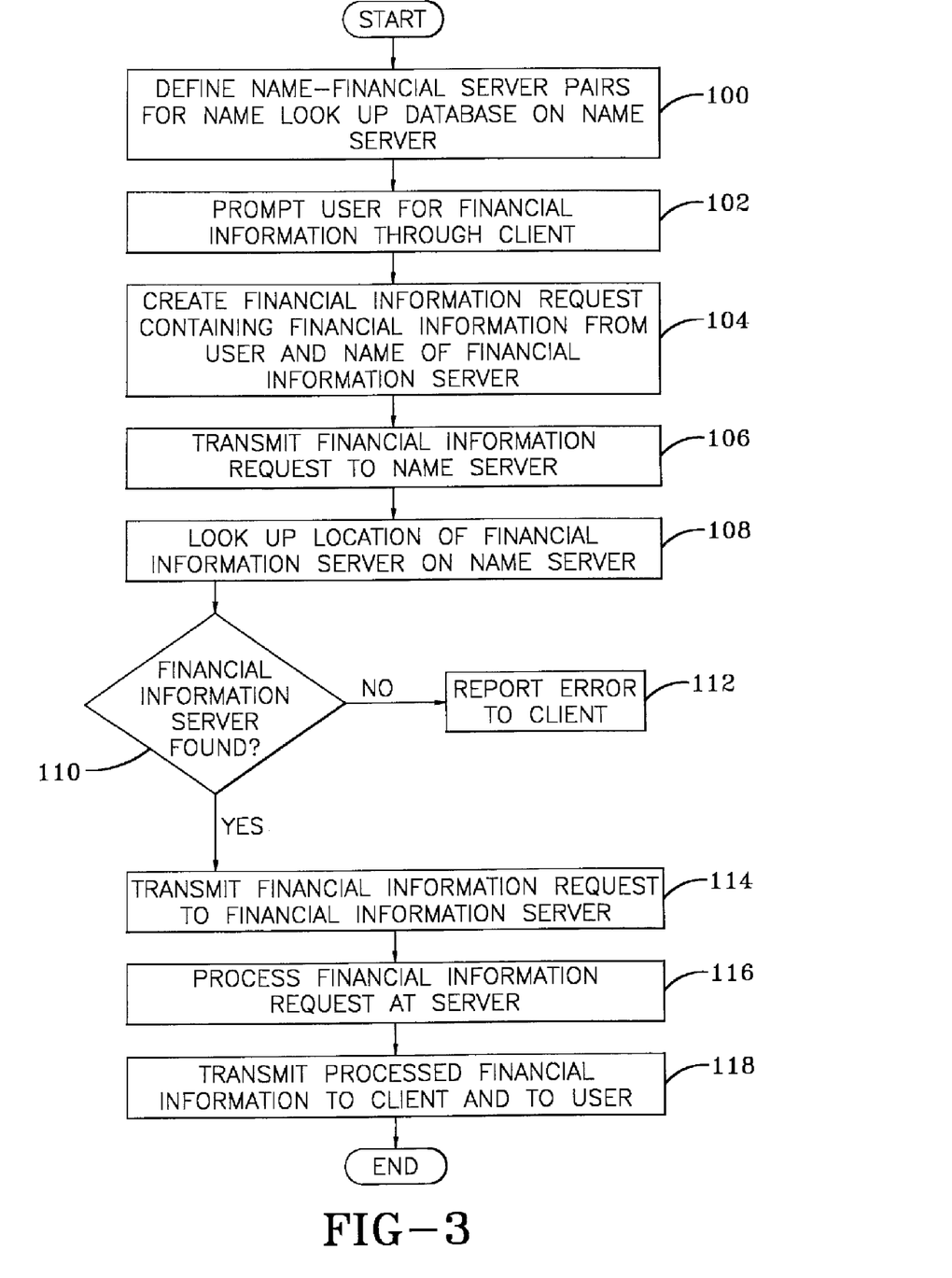
FIG. 3 is a flowchart of the primary steps of the present invention.

Referring now to FIG. 3, there is shown a flowchart of the primary steps of the present invention. Initially, name-financial server pairs are defined and loaded into a name lookup database on the name server 100. Name-server pairs may be added and/or modified as needed. Next, a user may be prompted for financial information such as the user's primary bank, account numbers, type of information desired (e.g., recent debit card transactions), etc. 102. The client with which the user is interacting (e.g., Web browser) may then create an electronic financial information request comprising the financial information provided by the user and the name of a financial information server that can provide the requested information 104. The electronic financial information request is then transmitted from the client to the name server 106. A database look-up is performed in accordance with the name contained in the financial information request 108. If the name of the financial information server is not found in the database 110, an error is reported to the client 112. If the name of the financial information server is found in the database 110, the financial information request is transmitted to the financial information server located during the database look-up 114. The financial information server then processes the financial information request 116 and the processed information is transmitted back to the client and ultimately, the user 118.

The distributed nature of the Conductor System Architecture means that a financial services system may be composed of relatively simple financial services applications accessible from one of several interfaces. The result of this is that each financial service application is easier to develop and maintain, and the Conductor-based financial services system at large is more flexible and robust. The present invention has been described in the form of preferred embodiments. However, several modifications and variations may be made to the invention and fall within the scope of the claims.

What is claimed is:

1. A system for providing to web users financial data from a plurality of financial institutions comprising:
    a plurality of financial information servers for accessing financial data from each of said plurality of financial institutions;
    a web server for receiving from client computers requests for financial data and for accessing said plurality of financial information servers to retrieve financial data requested by said client computers;
    a request for financial data from at least two of said plurality of financial information servers, said request received at said web server from a client computer;
    at least one process at said web server for performing the steps of:
        (a) determining which of said plurality of financial information servers to access to retrieve financial data responsive to said request for financial data from said at least two of said plurality of financial information servers;
        (b) communicating with said at least two of said plurality of financial information servers to retrieve said financial data responsive to said request for financial data;
        (c) receiving from said at least two of said plurality of financial information servers said financial data responsive to said request for financial data;
        (e) organizing for presentation at said client computer said financial data responsive to said request received from said at least two of said plurality of financial information servers; and
        (f) transmitting said organized financial data to said client computer.

2. The system of claim 1 wherein said at least two of said plurality of financial information servers are located at different geographic sites.

3. The system of claim 1 wherein said it at least two of said plurality of financial information servers are located at the same geographic site.

4. The system of claim 1 further comprising at least one data server for processing requests from at least one of said financial information servers to locate financial data responsive to said request.

5. The system of claim 1 wherein said request for financial data comprises a request for financial data from a plurality of financial institutions.

6. The system of claim 1 wherein said plurality of financial institutions are selected from the group consisting of banks, credit card companies, stock brokerages, and insurance companies.

7. The system of claim 1 wherein said financial data responsive to said request comprises data selected from the group consisting of account data and transaction data.

8. The system of claim 7 wherein said account data comprises data selected from the group consisting of bank account data, credit card account data, debit card account data, stock brokerage account data, and insurance account data.

9. The system of claim 7 wherein said account data comprises account balance data from a plurality of financial institutions.

10. The system of claim 7 wherein said transaction data comprises data selected from the group consisting of bank transaction data, credit card transaction data, debit card transaction data, stock transaction data, and insurance transaction data.

11. The system of claim 7 wherein said transaction data comprises transaction data from a plurality of financial institutions.

12. The system of claim 1 wherein said financial data responsive to said request comprises bill pay data.

13. The system of claim 1 wherein said financial data responsive to said request comprises account data and transaction data.

14. The system of claim 1 wherein said financial data responsive to said request comprises account data and bill pay data.

15. The system of claim 1 wherein said financial data responsive to said request comprises transaction data and bill pay data.

16. The system of claim 1 wherein said financial data responsive to said request comprises account data, transaction data and bill pay data.

17. The system of claim 1 wherein said web server comprises a user verification component for verifying a user identity prior to receiving said request for financial data.

18. The system of claim 1 wherein said financial data responsive to said request is saved at said client computer.

19. The system of claim 1 wherein said organized financial data is presented at said client computer in a web browser.

20. A method for providing to web users financial information from a plurality of financial institutions comprising:
    (a) providing a plurality of financial information servers for obtaining financial data from each of a plurality of financial institutions;
    (b) providing a web server for accessing said plurality of financial information servers to retrieve from said financial information servers financial data requested by clients;
    (c) receiving at said web server from a client a request for financial data from at least one of said plurality of financial information servers;
    (d) determining at said web server which of said plurality of financial information servers to access to retrieve financial data responsive to said request from said client;
    (e) transmitting from said web server to said financial information server an access request to retrieve financial data responsive to said request from said client;
    (f) receiving at said web server requested financial data from said financial information server;
    (g) organizing at said web server said requested financial data for presentation at said client; and
    (h) transmitting organized financial data from said web server to said client.

21. The method of claim 20 wherein providing a plurality of financial information servers comprises providing a plurality of financial information servers at different geographic sites.

22. The method of claim 20 wherein providing a plurality of financial information servers comprises providing a plurality of financial information servers at the same geographic site.

23. The method of claim 20 further comprising obtaining requested financial data from a data server accessed by said financial information server.

24. The method of claim 20 wherein said request for financial data comprises a request for financial data from a plurality of financial institutions.

25. The method of claim 20 wherein said plurality of financial institutions are selected from the group consisting of banks, credit card companies, stock brokerages, and insurance companies.

26. The method of claim 20 wherein said financial data responsive to said request comprises data selected from the group consisting of account data and transaction data.

27. The method of claim 26 wherein said account data comprises data selected from the group consisting of bank account data, credit card account data, debit card account data, stock brokerage account data, and insurance account data.

28. The method of claim 26 wherein said account data comprises account data from a plurality of financial institutions.

29. The method of claim 26 wherein said transaction data comprises data selected from the group consisting of bank transaction data, credit card transaction data, debit card transaction data, stock transaction data, and insurance transaction data.

30. The method of claim 26 wherein said transaction data comprises transaction data from a plurality of financial institutions.

31. The method of claim 20 wherein said financial data responsive to said request comprises bill pay data.

32. The method of claim 20 wherein said financial data responsive to said request comprises account data and transaction data.

33. The method of claim 20 wherein said financial data responsive to said request comprises account data and bill pay data.

34. The method of claim 20 wherein said financial data responsive to said request comprises transaction data and bill pay data.

35. The method of claim 20 wherein said financial data responsive to said request comprises account data, transaction data, and bill pay data.

36. The method of claim 20 wherein said organized financial data is saved at said client.

37. The method of claim 20 further comprising displaying said organized financial data at said client in a web browser.

38. A method for providing to web users financial information from a plurality of financial institutions comprising:
    (a) providing a plurality of financial information servers for obtaining financial data from each of a plurality of financial institutions;

(b) providing a web server for accessing said plurality of financial information servers to retrieve from said financial information servers financial data requested by clients;

(c) accepting at said web server a client request for financial data from at least two of said plurality of financial information servers;

(d) determining at said web server which of said plurality of financial information servers to access to retrieve financial data responsive to said request from said client;

(e) transmitting from said web server to a first financial information server a first access request to retrieve financial data responsive to said request from said client;

(f) receiving at said web server requested financial data from said first financial information server;

(g) transmitting from said web server to a second financial information server a second access request to retrieve financial data responsive to said request from said client;

(h) receiving at said web server requested financial data from said second financial information server;

(i) organizing at said web server said requested financial data from said first financial information server and said second financial information server for presentation at said client; and (j) transmitting organized financial data from said web server to said client.

39. The method of claim 38 wherein providing a plurality of financial information servers comprises providing a plurality of financial information servers at different geographic sites.

40. The method of claim 38 wherein providing a plurality of financial information servers comprises providing a plurality of financial information servers at the same geographic site.

41. The method of claim 38 further comprising obtaining requested financial data from a data server accessed by said first financial information server or said second financial information server.

42. The method of claim 38 wherein said plurality of financial institutions are selected from the group consisting of banks, credit card companies, stock brokerages, and insurance companies.

43. The method of claim 38 wherein said requested financial data from said first financial information server or said second financial information server comprises account data.

44. The method of claim 43 wherein said account data comprises data selected from the group consisting of bank account data, credit card account data, debit card account data, stock brokerage account data, and insurance account data.

45. The method of claim 38 wherein said requested financial data from said first financial information server or said second financial information server comprises transaction data.

46. The method of claim 45 wherein said transaction data comprises data selected from the group consisting of bank transaction data, credit card transaction data, debit card transaction data, stock transaction data, and insurance transaction data.

47. The method of claim 38 wherein said requested financial data from said first financial information server or said second financial information server comprises bill pay data.

48. The method of claim 38 wherein said financial data responsive to said request comprises account data and transaction data.

49. The method of claim 38 wherein said financial data responsive to said request comprises account data and bill pay data.

50. The method of claim 38 wherein said financial data responsive to said request comprises transaction data and bill pay data.

51. The method of claim 38 wherein said financial data responsive to said request comprises account data, transaction data and bill pay data.

52. The method of claim 38 further comprising verifying a user identity prior to receiving said request from said client at said web server.

53. The method of claim 38 further comprising displaying said organized financial data at said client in a web browser.

* * * * *

UNITED STATES PATENT AND TRADEMARK OFFICE
CERTIFICATE OF CORRECTION

PATENT NO. : 7,296,065 B2  Page 1 of 1
APPLICATION NO. : 11/306170
DATED : November 13, 2007
INVENTOR(S) : William P. Anderson and Jacob B. Geller It is certified that error appears in the above-identified patent and that said Letters Patent is hereby corrected as shown below:

Title Page; item (56);
In Other Publications page 2, please delete "'Bank Offer Customers Internet Access," Multimedia Daily, Mar. 22, 1995. ISSN: 1079-4212', and insert --"Bank Offer Customers Internet Access," Multimedia Daily, May. 22, 1995. ISSN: 1079-4212.--

In Other Publications page 2, please delete "Orbix Advance Programmer's Guide, Release 1.3.1 Dublin Ireland: IONA Technologies, Ltd., Feb. 1995," and insert --Orbix Advanced Programmer's Guide, Release 1.3.1 Dublin Ireland: IONA Technologies, Ltd., Feb. 1995.--

In Column 2, line 2, please delete "ConductorsSystem," and insert --Conductor$^{SM}$ System--.

Signed and Sealed this

Fifteenth Day of April, 2008

JON W. DUDAS
*Director of the United States Patent and Trademark Office*